United States Patent
Wang et al.

(10) Patent No.: US 9,709,840 B2
(45) Date of Patent: Jul. 18, 2017

(54) METHOD FOR PRODUCING LIQUID CRYSTAL PANEL AND HEATING DEVICE

(71) Applicants: BOE Technology Group Co., Ltd., Beijing (CN); Hefei Xinsheng Optoelectronics Technology Co., Ltd., Anhui (CN)

(72) Inventors: Kai Wang, Beijing (CN); Feng Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/105,122

(22) PCT Filed: Sep. 22, 2015

(86) PCT No.: PCT/CN2015/090260
§ 371 (c)(1),
(2) Date: Jun. 16, 2016

(87) PCT Pub. No.: WO2016/165285
PCT Pub. Date: Oct. 20, 2016

(65) Prior Publication Data
US 2017/0139261 A1    May 18, 2017

(30) Foreign Application Priority Data
Apr. 15, 2015    (CN) .......................... 2015 1 0179276

(51) Int. Cl.
*G02F 1/1333*    (2006.01)
*G02F 1/1368*    (2006.01)
(Continued)

(52) U.S. Cl.
CPC ...... *G02F 1/133382* (2013.01); *G02F 1/1303* (2013.01)

(58) Field of Classification Search
CPC .......................... G02F 1/133382; G02F 1/1303
See application file for complete search history.

(56) References Cited

U.S. PATENT DOCUMENTS

| 8,031,321 B2 | 10/2011 | Kim et al. |
| 2003/0013318 A1 | 1/2003 | Shiraishi et al. |
| 2004/0261697 A1 | 12/2004 | Ryu et al. |

FOREIGN PATENT DOCUMENTS

| CN | 1759343 | 4/2006 |
| CN | 101271233 A | 9/2008 |

(Continued)

OTHER PUBLICATIONS

International Search Report and Written Opinion for International Application No. PCT/CN2015/090260, dated Jan. 13, 2016.
(Continued)

*Primary Examiner* — Joseph L Williams
(74) *Attorney, Agent, or Firm* — Westman, Champlin & Koehler, P.A.

(57) ABSTRACT

The present disclosure provides a method for producing a liquid crystal panel and a heating device. The liquid crystal panel includes a first substrate, a second substrate and liquid crystals between the first and second substrates. The method includes: heating the liquid crystal panel placed onto the heating device; during the heating process adjusting a position of the liquid crystal panel in the heating device through at least one angle adjusting process, which includes adjusting an angle of the liquid crystal panel with respect to a plane in which the heating device is placed at least twice, the angle of the liquid crystal panel after each adjustment with respect to the plane has an absolute value larger than 0, and a sum (Continued)

of the angles of the liquid crystal panel which are obtained for all of at least two adjustments respectively, with respect to the plane is equal to 0.

20 Claims, 6 Drawing Sheets

(51) Int. Cl.
*G02F 1/1335* (2006.01)
*G02F 1/13* (2006.01)

(56) References Cited

FOREIGN PATENT DOCUMENTS

| | | |
|---|---|---|
| CN | 102253539 | 11/2011 |
| CN | 202256971 U | 5/2012 |
| CN | 103430282 | 12/2013 |
| CN | 104749810 | 7/2015 |
| JP | 9-61831 | 3/1997 |
| JP | 2003-262875 | 9/2003 |
| JP | 2005-195948 | 7/2005 |

OTHER PUBLICATIONS

English translation of Box No. V from the Written Opinion of the International Searching Authority for International Application No. PCT/CN2015/090260, dated Jan. 13, 2016.

First Office Action, including Search Report, for Chinese Patent Application No. 201510179276.5, dated Apr. 1, 2017, 6 pages.

METHOD FOR PRODUCING LIQUID CRYSTAL PANEL AND HEATING DEVICE

CROSS-REFERENCE TO RELATED APPLICATION

This application is a Section 371 National Stage Application of International Application No. PCT/CN2015/090260, filed on Sep. 22, 2015, entitled "METHOD FOR PRODUCING LIQUID CRYSTAL PANEL AND HEATING DEVICE", which has not yet published, which claims priority to Chinese Application No. 201510179276.5, filed on Apr. 15, 2015, incorporated herein by reference in their entirety.

BACKGROUND OF THE INVENTION

Field of the Invention

The present application relates to the technical field of display, and particularly, to a method for producing a liquid crystal panel and a heating device.

Description of the Related Art

A liquid crystal display is made of liquid crystal materials. Under the effect of an electric field, arrangement of liquid crystals will change, so that light rays passing through the liquid crystals will change accordingly. The change of light rays can be represented as change of brightness via a polarizer. In this way, the change of brightness of the light rays from the liquid crystal display is finally controlled by a control to the electric field, so as to achieve an object of displaying an image. A liquid crystal panel of the liquid crystal display is formed with a closed space by assembling two substrates. The closed space is filled with liquid crystals by an injection method or a drop adding method. Currently, the liquid crystal panel is manufactured by such injection method or the drop adding method of the liquid crystals. No matter which method as described above is adopted to fill the liquid crystals, there is a problem that the diffusion of the liquid crystals is not even within the closed space, especially at the corners thereof, even the liquid crystals cannot be diffused to the corners. In this way, an apparent chromatic aberration will occur upon macroscopically displaying, blank and light leakage will occur at the corners. This significantly deteriorates quality of a product. In order to enable the liquid crystals to distribute evenly, it is often needed to heat the liquid crystals after filling the liquid crystals, so as to sufficiently diffuse them.

In the prior art, the liquid panel is placed onto a horizontal bracket of a heating means, is heated by a hot gas flow. A heating temperature is higher than a clearing point of the liquid crystals to translate them into a liquid state and thus to diffuse them. The clearing point of the liquid crystals is meant to a temperature where the liquid crystals can become transparent.

However, because the bracket of the heating mean is fixed horizontally, along with increase of size of the liquid crystal panel (especially for high generation line, the entire substrate has a relatively large size), the substrate will deform and become convex and concave due to its gravity force, when being horizontally placed. As shown in FIG. 1, the liquid crystal panel includes a first substrate 101, a second substrate 102, and liquid crystals (not shown) between the first substrate 101 and the second substrate 102, wherein the first substrate 101 is placed opposite to the second substrate 102. A plurality of convex and concave portions are generated on the liquid crystal panel due to its gravity force, and thus there are more liquid crystals at the concave portions 103 and less liquid crystals at the convex portions 104. The diffusion uniformity of the liquid crystals at the edge and the corners is poor and fluidity of the liquid crystals is not good. Thus, this results in bad uniformity in thickness of the liquid crystal panel cell and the chromatic aberration is generated thereon. Further, it will affect a pre-tilt effect of a lower alignment film to the liquid crystals, and there are the chromatic aberration and response time difference present later, especially, it is difficult to repeatedly diffuse at the corners. The larger the substrate is, more apparent the phenomenon of the non-uniformity becomes. This will degrade the display quality.

SUMMARY

In order to solve the above problem of poor displaying quality of the liquid crystal panel, an embodiment of the present application provides a method for producing a liquid crystal panel and a heating device. The technical solutions thereof are as follows:

In accordance with one aspect, it provides a method for producing a liquid crystal panel, wherein the liquid crystal panel comprises a first substrate, a second substrate and liquid crystals between the first substrate and the second substrate, the method comprises the steps of:

heating the liquid crystal panel placed onto a heating device;

adjusting a position of the liquid crystal panel in the heating device through at least one angle adjusting process during the heating process, wherein the at least one angle adjusting process comprising:

adjusting an angle of the liquid crystal panel with respect to a plane in which the heating device is placed at least twice, the angle of the liquid crystal panel after each adjustment with respect to the plane in which the heating device is located has an absolute value larger than 0, and a sum of the angles of the liquid crystal panel which are obtained for all of at least two adjustments respectively, with respect to the plane in which the heating device is placed, is equal to 0.

In one example, before the step of heating the liquid crystal panel placed on the heating device, the method further comprises:

retrieving an inclination angle of the liquid crystal panel; and determining a heating time duration of the liquid crystal panel.

In one example, the step of heating the liquid crystal panel placed on the heating device further comprises:

heating the liquid crystal panel placed onto the heating device within the heating time duration, wherein an absolute value of the angle of the liquid crystal panel with respect to the plane in which the heating device is placed is equal to an absolute value of the inclination angle of the liquid crystal panel.

In one example, the inclination angle is larger than or equal to 5° but smaller than or equal to 10°; and the heating time duration is larger than or equal to 2 minutes but smaller than or equal to 5 minutes.

In one example, a plurality of pillars for fixing the liquid crystal panel are provided within the heating device, each pillar is provided with a telescopic motor, and before the step of heating the liquid crystal panel placed on the heating device, the method further comprises:

fixing an edge of the liquid crystal panel onto the pillar of the heating device so that the liquid crystal panel is parallel to the plane in which the heating device is placed.

In one example, the step of adjusting the position of the liquid crystal panel in the heating device through the at least one angle adjusting process, comprises:

during each angle adjusting process, adjusting the angle of the liquid crystal panel with respect to the plane in which the heating device is placed by adjusting a telescopic length of at least one telescopic motor so that the position of the liquid crystal panel in the heating device is adjusted.

In one example, the step of retrieving the inclination angle of the liquid crystal panel comprises determining the inclination angle of the liquid crystal panel depending on sizes of the first substrate and the second substrate, and a size of a display unit within the first and second substrates;

the step of determining the heating time duration of the liquid crystal panel comprises determining the heating time duration of the liquid crystal panel depending on sizes of the first substrate and the second substrate, and a size of a display unit within the first and second substrates.

In one example, the same inclination angle corresponds to the same heating time duration.

In one example, before the step of heating the liquid crystal panel placed on the heating device, the method further comprises:

preheating the liquid crystal panel placed on the heating device in a preset duration.

In one example, the preset duration is larger than or equal to 50 minutes but less than or equal to 70 minutes.

In accordance with another aspect of the present application, it provides a heating device for a liquid crystal panel, configured to heat liquid crystals of the liquid crystal panel, wherein the liquid crystal panel comprises a first substrate, a second substrate, and liquid crystals between the first and second substrates, the heating device comprises:

a heating unit, configured to heat the liquid crystal panel placed on the heating device;

an adjusting unit, configured to, during the heating process, adjust the position of the liquid crystal panel in the heating device through at least one angle adjusting process, wherein the at least one angle adjusting process includes:

adjusting an angle of the liquid crystal panel with respect to a plane in which the heating device is placed at least twice, the angle of the liquid crystal panel after each adjustment with respect to the plane in which the heating device is placed has an absolute value larger than 0, and a sum of the angles of the liquid crystal panel which are obtained for all of at least two adjustments respectively, with respect to the plane in which the heating device is placed, is equal to 0.

In one example, the heating device further comprises:

a retrieving unit configured to retrieve the inclination angle of the liquid crystal panel;

a determining unit configured to determine the heating time duration of the liquid crystal panel.

In one example, the heating unit comprises a heating sub-unit configured to heat the liquid crystal panel placed on the heating device during the heating time duration;

the adjusting unit comprises a first adjusting sub-unit configured to during the heating process, adjust the position of the liquid crystal panel in the heating device through the at least one angle adjusting process according to the inclination angle, wherein an absolute value of the angle of the liquid crystal panel after each adjustment with respect to the plane in which the heating device is placed is an absolute value of the inclination angle, and the sum of the angles of the liquid crystal panel which are obtained for all of at least two adjustments respectively, with respect to the plane in which the heating device is placed, is equal to 0.

In one example, the inclination angle is larger than or equal to 5° but less than or equal to 10°;

the heating time duration is larger than or equal to 2 minutes but less than or equal to 5 minutes.

In one example, a plurality of pillars for fixing the liquid crystal panel are provided within the heating device, each pillar is provided with a telescopic motor.

In one example, the heating device further comprising:

a fixing unit configured to fix an edge of the liquid crystal panel on the pillar of the heating device, so that the liquid crystal panel is parallel to the plane in which the heating device is placed.

In one example, the adjusting unit comprises a second adjusting sub-unit, configured to during each angle adjusting process adjust the angle of the liquid crystal panel with respect to the plane in which the heating device is located by adjusting a telescopic length of at least one telescopic motor, so that the position of the liquid crystal panel in the heating device is adjusted.

In one example, the retrieving unit comprises a retrieving sub-unit configured to determine an inclination angle of the liquid crystal panel depending on sizes of the first and second substrates and a size of the display unit within the first and second substrates;

the determining unit comprises a determining sub-unit configured to determine a heating time duration of the liquid crystal panel depending on the sizes of the first and second substrates and the size of the display unit within the first and second substrates.

In one example, the same inclination angle corresponds to the same heating time duration.

In one example, the heating device further comprising:

a preheating unit configured to preheat the liquid crystal panel placed on the heating device in a preset duration.

In one example, the preset duration is larger than or equal to 50 minutes but less than or equal to 70 minutes.

Embodiments of the present application provide the method for producing the liquid crystal panel and the heating device. During the heating process with the heating device, the position of the liquid crystal panel in the heating device is adjusted by at least one angle adjusting process, so as to achieve the object of heating the inclined liquid crystal panel at multiple times. As compared to the liquid crystal heating means upon producing the existing liquid crystal panel, the liquid crystals diffuse more sufficiently and uniformly within the closed space formed by the substrates, especially for the liquid crystals at the edge and corners thereof. This will not affect the pre-tilt effect of the lower alignment film of the liquid crystal panel to the liquid crystals. Therefore, the displaying quality of the liquid crystal panels is improved.

It should be understood that the general description above and the detailed description below are illustrative and interpretive, rather than limiting the present application.

BRIEF DESCRIPTION OF THE DRAWINGS

In order to better clearly explain the technical solutions of the embodiments of the present application, the drawings used for the embodiments are discussed briefly herein. Obviously, the following drawings are only directed to only one part of the embodiments, and the person skilled in the art can obtain other figures from the above drawings without any creative efforts.

DETAILED DESCRIPTION OF THE EMBODIMENTS

In order to enable objectives, technical solutions and advantages of the present application to become more clear, the implementations of the embodiments of the present application are described in detail in conjunction with the drawings attached herein.

Figure 1:
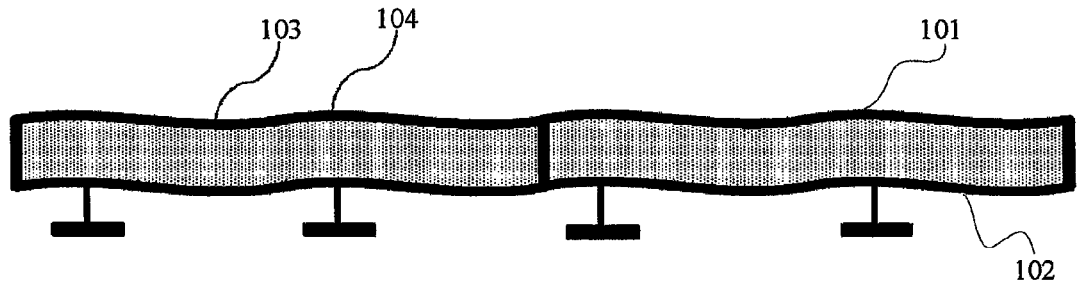
FIG. 1 is a schematic view for showing distribution of liquid crystals of an existing liquid crystal panel.
Figure 2:
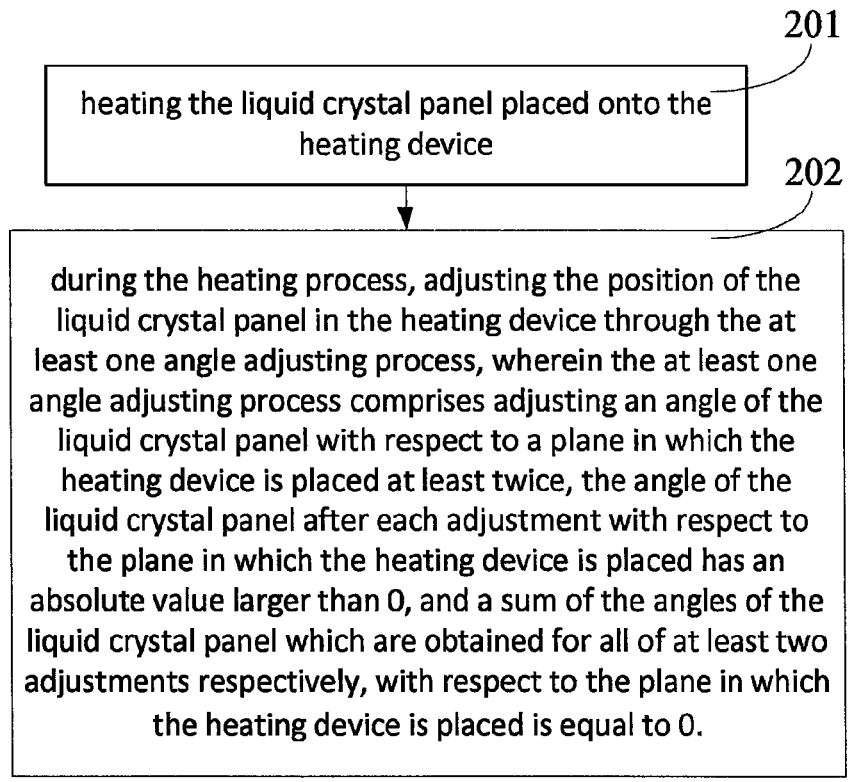
FIG. 2 is a flowchart of a method for producing a liquid crystal panel in accordance with an embodiment of the present application.

An embodiment of the present application provides a method for producing a liquid crystal panel, including a first substrate, a second substrate and liquid crystals (molecules) between the first and second substrates. As shown in FIG. 2, the method includes the steps of:

S201: heating the liquid crystal panel placed onto a heating device.

S202: adjusting a position of the liquid crystal panel in the heating device through at least one angle adjusting process during the heating process, specifically, the at least one angle adjusting process including:

adjusting an angle of the liquid crystal panel with respect to a plane in which the heating device is placed at least twice, the angle of the liquid crystal panel after each adjustment with respect to the plane in which the heating device is placed has an absolute value larger than 0, and a sum of the angles of the liquid crystal panel which are obtained for all of at least two adjustments respectively, with respect to the plane in which the heating device is placed, is equal to 0.

Concerning the above, with the method for producing the liquid crystal panel of the present embodiment, during the heating process, the position of the liquid crystal panel in the heating device is adjusted by at least one angle adjusting process, so as to heat the inclined liquid crystal panel at multiple times. As compared to the liquid crystal heating means upon producing the existing liquid crystal panel, the liquid crystals diffuse more sufficiently and uniformly within the closed space formed by the substrates, especially for the liquid crystals at the edge and corners thereof. This will not affect the pre-tilt effect of the lower alignment film of the liquid crystal panel to the liquid crystals. Therefore, the displaying quality of the liquid crystal panels is improved.

Further, before the step 201, the method further includes: retrieving an inclination angle of the liquid crystal panel; and determining a heating time duration of the liquid crystal panel.

The step S201 includes heating the liquid crystal panel placed onto the heating device within the heating time duration.

The step S202 includes during the heating process, adjusting the position of the liquid crystal panel in the heating device depending on the inclination angle through the at least one angle adjusting process, wherein an absolute value of the inclination angle is one of the angle of the liquid crystal panel after each adjustment with respect to the plane in which the heating device is placed, and the sum of the angles of the liquid crystal panel which are obtained for all of at least two adjustments respectively, with respect to the plane in which the heating device is placed, is equal to 0.

Preferably, the inclination angle is larger than or equal to 5° but smaller than or equal to 10°; and the heating time duration is larger than or equal to 2 minutes but smaller than or equal to 5 minutes.

It should be noted in addition that the plane in which the heating device is placed is meant to a plane in which the heating device is place when the heating device is normally placed, meant to normally a horizontal plane. A plurality of pillars are provided within the heating device for fixing the liquid crystal panel. Each pillar is provided with a telescopic motor. Before the step S201, the method may further include fixing an edge of the liquid crystal panel onto the pillar of the heating device so that the liquid crystal panel is parallel to the plane in which the heating device is placed, i.e., the liquid crystal panel is horizontally fixed onto the heating device and the surface of the liquid crystal panel is kept to be parallel to the horizontal plane.

Accordingly, the step S202 includes: adjusting the angle of the liquid crystal panel with respect to the plane in which the heating device is placed by adjusting a telescopic length of each telescopic motor, during adjusting the angle each time, so as to adjust the position of the liquid crystal plane in the heating device.

As an example, the step of retrieving the inclination angle of the liquid crystal panel includes: determining the inclination angle of the liquid crystal panel depending on sizes of the first substrate and the second substrate and a size of a display unit within the first substrate and the second substrate.

The step of determining the heating time duration of the liquid crystal panel includes: determining the heating time duration of the liquid crystal panel depending on sizes of the first substrate and the second substrate and a size of a display unit within the first substrate and the second substrate.

As an example, the same inclination angle corresponds to the same heating time duration.

Before the step S201, the method may further include: heating the liquid crystal panel placed on the heating device within a preset duration. As an example, the preset duration is greater than or equal to 50 minutes, and less than or equal to 70 minutes.

Concerning the above, with the method for producing the liquid crystal panel of the present embodiment, during the heating process, the position of the liquid crystal panel in the heating device is adjusted by at least one angle adjusting process, so as to heat the inclined liquid crystal panel at multiple times. As compared to the liquid crystal heating means upon producing the existing liquid crystal panel, the liquid crystals diffuse more sufficiently and uniformly within the closed space formed by the substrates, especially for the liquid crystals at the edge and corners thereof. This will not affect the pre-tilt effect of the lower alignment film of the liquid crystal panel to the liquid crystals. Therefore, the displaying quality of the liquid crystal panels may be improved.

Figure 3:
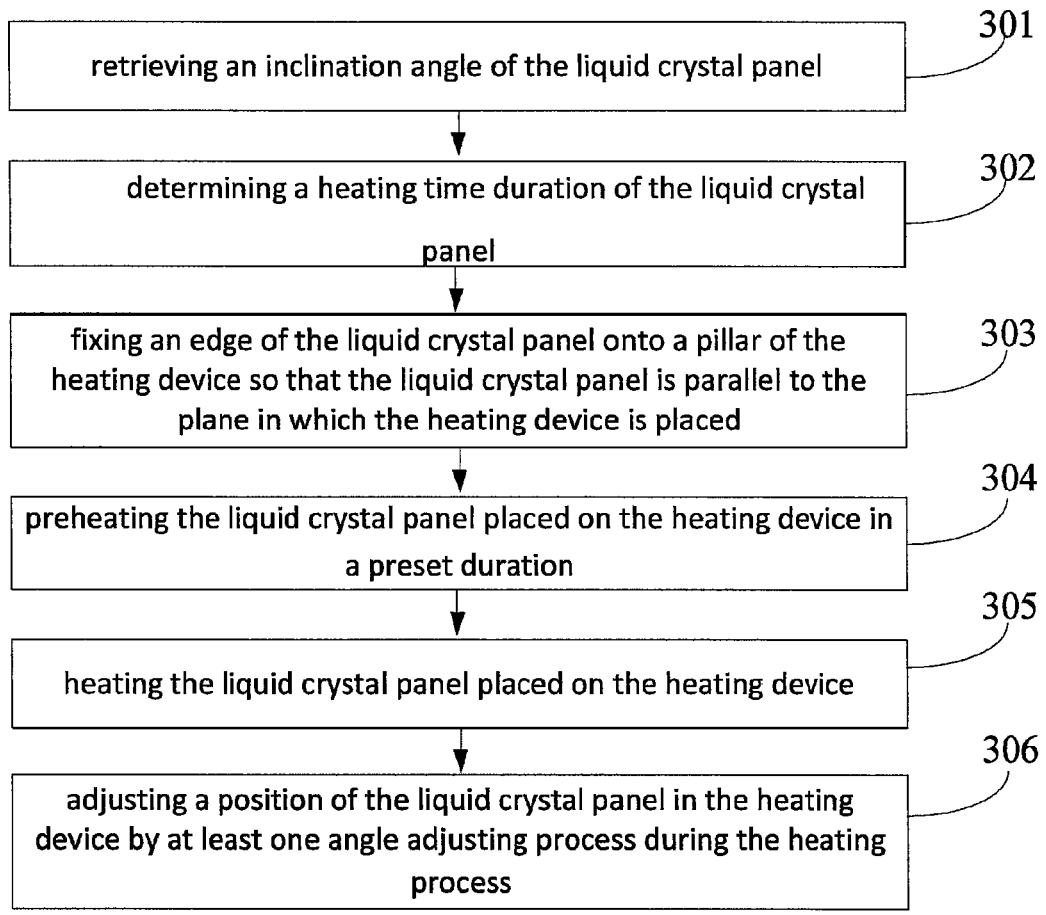
FIG. 3 is a flowchart of a method for producing another liquid crystal panel in accordance with an embodiment of the present application.

Another embodiment of the present application also provides another method for producing a liquid crystal panel, which includes a first substrate, a second substrate and liquid crystals between the first substrate and the second substrate. As shown in FIG. 3, the method includes:

Step S301, retrieving an inclination angle of the liquid crystal panel.

The inclination angle of the liquid crystal panel can be determined depending on sizes of the first substrate and the second substrate, and a size of a display unit within the first and second substrates. It can also be determined based on other properties of the substrate, and the present application does not make any limitation on this. Normally, the determined inclination angle of the liquid crystal panel is larger than or equal to 5° but less than or equal to 10°.

Step S302, determining a heating time duration of the liquid crystal panel.

As such, the heating time duration of the liquid crystal panel can be determined depending on sizes of the first substrate and the second substrate, and a size of a display unit within the first and second substrates. It can also be determined based on other properties of the substrate, and the present application does not make any limitation on this. Normally, the heating time duration is larger than or equal to 2 minutes but less than or equal to 5 minutes.

Illustratively, when the substrate of the liquid crystal panel has a size of 55 inches, it can determine the heating time duration of the liquid crystal panel to be 3 minutes. The inclination angle and the heating time duration in the steps S301 and S302 can also be optimally configured based on the size of the substrate and the size of the display unit within the substrates.

Step S303: fixing an edge of the liquid crystal panel onto a pillar of the heating device so that the liquid crystal panel is parallel to the plane in which the heating device is placed.

Figure 4:
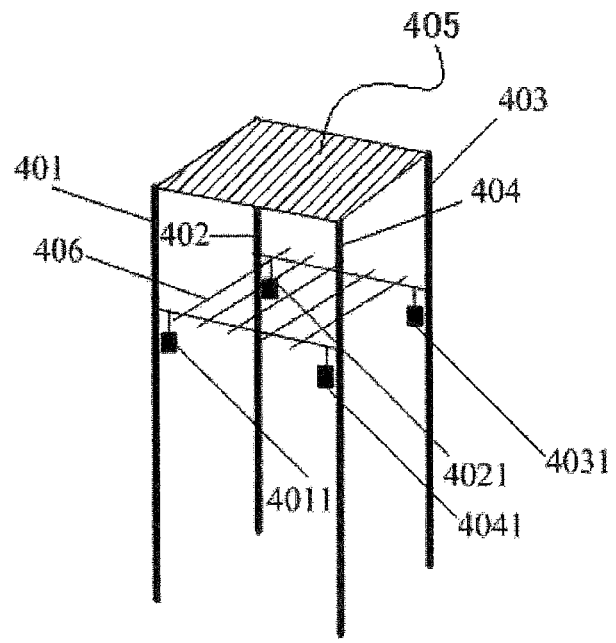
FIG. 4 is a schematic view for showing a structure of a heating device in accordance with an embodiment of the present application.
Figure 5:
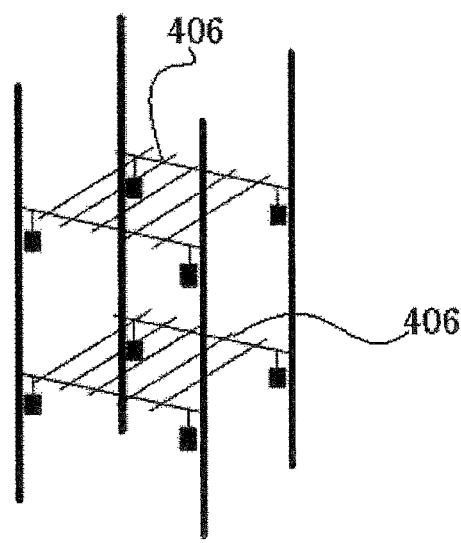
FIG. 5 is a schematic view for showing a structure of another heating device in accordance with an embodiment of the present application.

In the present embodiment, a plurality of pillars for fixing the liquid crystal panel are provided within the heating device for heating the liquid crystals of the liquid crystal panel. Illustratively, four pillars are provided. Each pillar is provided with a telescopic motor, as shown in FIG. 4. FIG. 4 shows a case that the liquid crystal panel 405 is not provided on the bracket 406 (as discussed below). Four pillars 401, 402, 403 and 404 are shown in FIG. 4. A telescopic motor 4011 is provided on the pillar 401, a telescopic motor 4021 is provided on the pillar 402, a telescopic motor 4031 is provided on the pillar 403, and a telescopic motor 4041 is provided on the pillar 404. A bracket 406 is provided onto the four pillars and is composed of a plurality of bars. Under the telescopic effect of the telescopic motor, the bars will tilt the bracket 406, and thus incline the liquid crystal panel on the bracket 406. It should be noted that FIG. 4 shows a heating device in a single layer in which one liquid crystal panel can be horizontally placed and is heated, in other words, the liquid crystal panel is placed to be parallel to the plane in which the heating device is placed. The method for producing the liquid crystal panel in accordance with the embodiment of the present application is also applicable into the heating device in multiple layers, as shown in FIG. 5. The heating device of FIG. 5 is provided with two brackets 406, and thus two liquid crystal panels can be placed horizontally within it and are heated. Four pillars of each layer are provided with telescopic motors, so that the two liquid crystal panels to be inclined can be heated at multiple times, so as to obtain the effect of diffusing the liquid crystals more uniformly. In view of most of the structure as shown in FIG. 5 identical with that as shown in FIG. 4, they are omitted herein. Furthermore, it should be noted that the liquid crystal panel fixed on the bracket of the heating device is an optimized product, and thus it is easy to be fixed and would not bring about any difficulty in terms of management and operation.

Step S304, preheating the liquid crystal panel placed on the heating device in a preset duration.

When the liquid crystal panel is in parallel to and fixed onto the pillars of the heating device, the liquid crystal panel is preheated in the preset duration, so as to ensure the curing of a sealing frame glue on the liquid crystal panel after being heated. Illustratively, the preset duration is larger than or equal to 50 minutes but less than or equal to 70 minutes.

Step S305, heating the liquid crystal panel placed on the heating device.

Specifically, the step S305 can include heating the liquid crystal panel placed on the heating device in the heating time duration.

In accordance with the heating time duration of the liquid crystal panel determined at the step S302, the liquid crystal panel placed on the heating device is heated.

Step S306, adjusting a position of the liquid crystal panel in the heating device by at least one angle adjusting process during the heating process.

The at least one angle adjusting process includes: adjusting the angle of the liquid crystal panel with respect to the plane in which the heating device is placed at least twice, wherein an absolute value of the angle of the liquid crystal panel after each adjustment with respect to the plane in which the heating device is placed is larger than 0, and a sum of the angles of the liquid crystal panel which are obtained for all of at least two adjustments respectively, with respect to the plane in which the heating device is placed, is equal to 0.

The step S306 can specifically include: during the heating process, adjusting the position of the liquid crystal panel in the heating device through the at least one angle adjusting process according to the inclination angle, wherein an absolute value of the angle of the liquid crystal panel after each adjustment with respect to the plane in which the heating device is placed is an absolute value of the inclination angle, and the sum of the angles of the liquid crystal panel which are obtained for all of at least two adjustments respectively, with respect to the plane in which the heating device is placed is equal to 0. The position of the liquid crystal panel in the heating device is adjusted so that the liquid crystal panel is placed to be parallel to the plane in which the heating device is placed. As an example, the same inclination angle corresponds to the same heating time duration.

In combination with the structural schematic view of the heating device as shown in FIG. 4, the step S306 correspondingly includes: during each angle adjusting process, adjusting the angle of the liquid crystal panel with respect to the plane in which the heating device is placed by adjusting the telescopic length of each telescopic motor so that the position of the liquid crystal panel in the heating device is adjusted.

Figure 6:
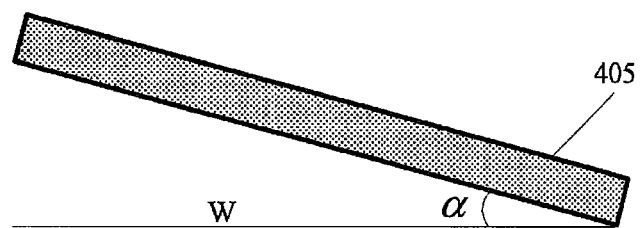
FIG. 6 is a schematic view for showing the liquid crystal panel obliquely provided in the heating device as shown in FIG. 4 or 5.

The inclination angle is the angle obtained at the step S301, and the heating time duration is the duration determined at the step S302. Assuming that the inclination angles of the liquid crystal panel currently to be heated in FIG. 4 are +8° and −8°, and the heating time duration is 3 minutes, one implementation for the step S306 is:

to raise the telescopic motor 4011 on the pillar 401 and the telescopic motor 4021 on the pillar 402 at the same time, to adjust the angle of the liquid crystal panel 405 with respect to the plane (horizontal plane) in which the heating device is placed by adjusting the telescopic length of the telescopic motor so that the inclination angle α is equal to 8° (that is, the angle obtained after clockwise rotating with respect to the plane in which the heating device is placed is a positive angle), as shown in FIG. 6, and to keep the heating time duration for 3 minutes, so that the liquid crystals on the substrates diffuse towards a lower part, i.e., the direction where the pillars 403 and 404 are located;

then to raise the telescopic motor 4031 on the pillar 403 and the telescopic motor 4041 on the pillar 404 at the same time, to adjust the angle of the liquid crystal panel 405 with respect to the plane in which the heating device is placed by adjusting the telescopic length of the telescopic motor so that the inclination angle α is equal to −8° (that is, the angle obtained after anticlockwise rotating with respect to the plane in which the heating device is placed is a negative angle), and to keep the heating time duration for 3 minutes so that the liquid crystals on the substrate diffuse towards the direction where the pillars 401 and 402 are located;

then to raise the telescopic motor 4021 on the pillar 402 and the telescopic motor 4031 on the pillar 403 at the same time, and to adjust the angle of the liquid crystal panel 405 with respect to the plane in which the heating device is placed by adjusting the telescopic length of the telescopic motor so that the inclination angle α is equal to 8°, and to keep the heating time duration for 3 minutes so that the liquid crystals on the substrate diffuse towards the direction where the pillars 401 and 404 are located;

then to raise the telescopic motor 4011 on the pillar 401 and the telescopic motor 4041 on the pillar 404 at the same time, to adjust the angle of the liquid crystal panel 405 with respect to the plane in which the heating device is placed by adjusting the telescopic length of the telescopic motor so that the inclination angle α is equal to −8°, and to keep the heating time duration for 3 minutes so that the liquid crystals on the substrate diffuse towards the direction where the pillars 402 and 403 are located; and finally to adjust the position of the liquid crystal panel in the heating device, so that the liquid crystal panel is parallel to the plane in which the heating device is placed. At this point, one angle adjusting process is finished.

As shown in FIG. 4, assuming that the inclination angles of the liquid crystal panel being heated are +8° and −8°, and the heating time duration is 3 minutes, another implementation to implement the step S306 is:

(1) to raise the telescopic motor 4011 on the pillar 401, to adjust the angle of the liquid crystal panel with respect to the plane in which the heating device is placed by means of adjusting the telescopic length of the telescopic motor 4011 so that the inclination angle α is equal to 8°, and to keep the heating time duration for 3 minutes so that the liquid crystals on the substrate diffuse towards the direction where the pillar 403 is located (at this time, it should be noted that in this case, in order to keep the stability of entire liquid crystal panel 405, it is possible to adjust the height of the telescopic motors 4021 and 4041 as required), and then to raise the telescopic motor 4031 on the pillar 403, to adjust the angle of the liquid crystal panel with respect to the plane in which the heating device is placed by means of adjusting the telescopic length of the telescopic motor 4031 so that the inclination angle α is equal to −8°, and to keep the heating time duration for 3 minutes so that the liquid crystals on the substrate diffuse towards the direction where the pillar 401 is located (at this time, it should be noted that in this case, in order to keep the stability of entire liquid crystal panel 405, it is possible to adjust the height of the telescopic motors 4021 and 4041 as required);

(2) and then to raise the telescopic motor 4021 on the pillar 402, to adjust the angle of the liquid crystal panel with respect to the plane in which the heating device is placed by means of adjusting the telescopic length of the telescopic motor 4021 so that the inclination angle α is equal to 8°, and to keep the heating time duration for 3 minutes so that the liquid crystals on the substrate diffuse towards the direction where the pillar 404 is located (at this time, it should be noted that in this case, in order to keep the stability of entire liquid crystal panel 405, it is possible to adjust the height of the telescopic motors 4011 and 4031 as required), and then to raise the telescopic motor 4041 on the pillar 404, to adjust the angle of the liquid crystal panel with respect to the plane in which the heating device is placed by means of adjusting the telescopic length of the telescopic motor 4041 so that the inclination angle α is equal to −8°, and to keep the heating time duration for 3 minutes so that the liquid crystals on the substrate diffuse towards the direction where the pillar 402 is located (at this time, it should be noted that in this case, in order to keep the stability of entire liquid crystal panel 405, it is possible to adjust the height of the telescopic motors 4011 and 4031 as required);

finally, adjusting the position of the liquid crystal panel in the heating device so that the liquid crystal panel is parallel to the plane in which the heating device is placed. At this point, one angle adjusting process is finished.

Of course, it is also possible to decide the times at which the above described angle adjusting process is performed depending on the distribution of the liquid crystals in the liquid crystal panel, so as to optimize the distribution of the liquid crystals by performing the adjustments at multiple times.

Further, it should be noted that there are many ways of inclination upon heating the liquid crystals with the method for producing the liquid crystal panel in accordance with the present embodiment. Illustratively, it is possible to raise two telescopic motors on the two adjacent pillars at the same time; and alternatively to raise the telescopic motors on the three adjacent pillars at the same time. The inclination way can be selected depending on the arrangement of the product on the substrate. Furthermore, the inclination way can be achieved by programming on the heating equipment, i.e., the heating device, and the number of the program is in a range of 1~n, wherein n is a largest achievable inclination number. The present embodiment does not make any limitation to this. Meanwhile, in order to ensure the liquid crystals on the substrate in the liquid crystal panel to diffuse more uniformly, a plurality of angle adjusting processes can be performed, and the number thereof can be determined based on the actual requirement.

It should be noted that in one case, the first substrate of the liquid crystal panel is a color filter substrate and the second substrate thereof is an array substrate; and in another alternative case, the first substrate of the liquid crystal panel is an array substrate and the second substrate thereof is a color filter substrate.

There is a groove structure at an inner side of the substrate and is attached with an alignment film. Therefore, if the liquid crystals within the closed space formed by the substrates are not diffused uniformly, then it would affect the pre-tilt effect of the lower alignment film of the liquid crystal panel to the liquid crystals. In contrast, the method for producing the liquid crystal panel in accordance with the embodiment of the present application can enable the liquid to diffuse more sufficiently and more uniformly, especially for the liquid crystals at the positions of the edge and corners. The liquid crystal panel cell has a relatively high uniformity of thickness, and it would not affect the pre-tilt effect of the lower alignment film of the liquid crystal panel to the liquid crystals. In later usage, there are less phenomena such as chromatic abbreviation, and the difference of the response time.

It should be noted that the sequence of the steps in the method for producing the liquid crystal panel in accordance with the embodiment of the present application can be adjusted appropriately. The steps thereof can be accordingly added or deleted according to the condition. Changes to the method which can be easily thought out by the person skilled in the art and in the scope of the disclosure of the present application shall fall within the scope of the present application, and they are not repeated again.

Concerning the above, with the method for producing the liquid crystal panel of the present embodiment, during the heating process, the position of the liquid crystal panel in the heating device is adjusted by at least one angle adjusting process, so as to achieve the object of heating the inclined liquid crystal panel at multiple times. As compared to the liquid crystal heating means upon producing the existing liquid crystal panel, the liquid crystals diffuse more sufficiently and uniformly within the closed space formed by the substrates, especially for the liquid crystals at the edge and corners thereof. This will not affect the pre-tilt effect of the lower alignment film of the liquid crystal panel to the liquid crystals. Therefore, the displaying quality of the liquid crystal panels is improved.

As shown in FIG. 6, it can be deemed to upwardly raise the left end of the liquid crystal panel 405 as shown with respect to the plane in which the heating device is placed (i.e., the horizontal plane W) in a manner of clockwise rotation, and at this time, the formed angle α is considered to be a positive angle; and accordingly, if the right end of the liquid crystal panel 405 as shown is raised anticlockwise with respect to the plane in which the heating device is placed (i.e., the horizontal plane W), and at this time the formed angle α is considered to be a negative angle. For example, the angle α as shown in FIG. 6 is 8°.

Figure 7:
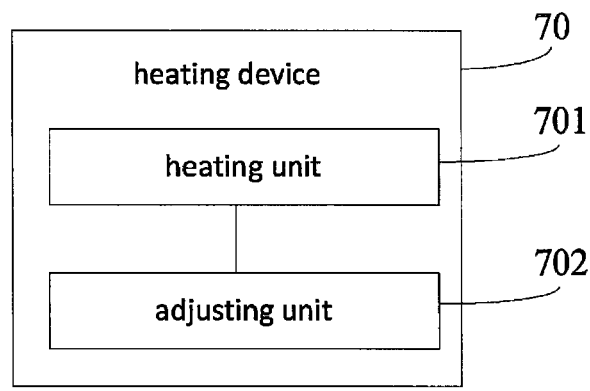
FIG. 7 is a block schematic view of a further heating device in accordance with an embodiment of the present application.

An embodiment of the present application provides a heating device 70 of a liquid crystal panel, so as to heat the liquid crystals of the liquid crystal panel. The liquid crystal panel includes a first substrate, a second substrate, and liquid crystals between the first and second substrates. As shown in FIG. 7, the heating device 70 includes:

a heating unit 701, configured to heat the liquid crystal panel placed on the heating device;

an adjusting unit 702, configured to, during the heating process, adjust the position of the liquid crystal panel in the heating device through the at least one angle adjusting process, wherein the at least one angle adjusting process includes:

to adjust an angle of the liquid crystal panel with respect to a plane in which the heating device is placed at least twice, the angle of the liquid crystal panel after each adjustment with respect to the plane in which the heating device is placed has an absolute value larger than 0, and a sum of the angles of the liquid crystal panel which are obtained for all of at least two adjustments respectively, with respect to the plane in which the heating device is placed, is equal to 0.

Concerning the above, with the method for producing the liquid crystal panel of the present embodiment, during the heating process, the position of the liquid crystal panel in the heating device is adjusted by at least one angle adjusting process, so as to heat the inclined liquid crystal panel at multiple times. As compared to the liquid crystal heating means upon producing the existing liquid crystal panel, the liquid crystals diffuse more sufficiently and uniformly within the closed space formed by the substrates, especially for the liquid crystals at the edge and corners thereof. This will not affect the pre-tilt effect of the lower alignment film of the liquid crystal panel to the liquid crystals. Therefore, the displaying quality of the liquid crystal panels is improved.

Figure 8:
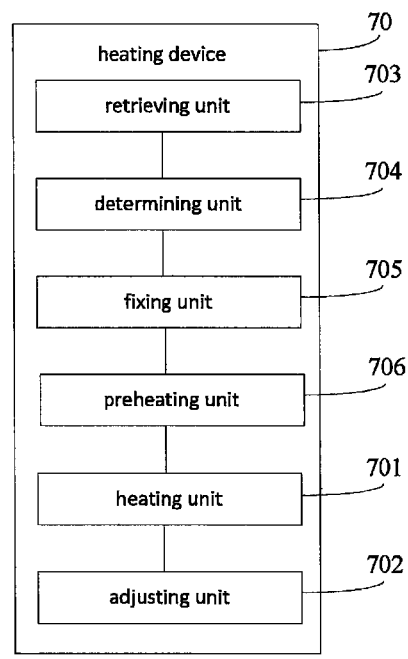
FIG. 8 is a block schematic view of a yet further heating device in accordance with an embodiment of the present application.

Another embodiment of the present application provides another heating device 70 of a liquid crystal panel, so as to heat the liquid crystals of the liquid crystal panel. The liquid crystal panel includes a first substrate, a second substrate, and liquid crystals between the first and second substrates. As shown in FIG. 8, the heating device 70 includes:

a heating unit 701, configured to heat the liquid crystal panel placed on the heating device;

an adjusting unit 702, configured to, during the heating process, adjust the position of the liquid crystal panel in the heating device through the at least one angle adjusting process, wherein the at least one angle adjusting process includes:

to adjust an angle of the liquid crystal panel with respect to the plane in which the heating device at least twice, the angle of the liquid crystal panel after each adjustment with respect to the plane in which the heating device is placed has an absolute value larger than 0, and a sum of the angles of the liquid crystal panel which are obtained for all of at least two adjustments respectively, with respect to the plane in which the heating device is placed is equal to 0;

a retrieving unit 703, configured to retrieve an inclination angle of the liquid crystal panel, for example, the inclination angle is larger than or equal to 5° but less than or equal to 10°;

a determining unit 704, configured to determine a heating time duration of the liquid crystal panel, for example, the heating time duration is larger than or equal to 2 minutes but less than or equal to 5 minutes;

a fixing unit 705, configured to fix the edge of the liquid crystal panel on the pillar of the heating device, so that the liquid crystal panel is parallel to the plane in which the heating device is placed;

a preheating unit 706, configured to preheat the liquid crystal panel placed on the heating device in a preset duration, for example, the preset duration is larger than or equal to 50 minutes but less than or equal to 70 minutes.

Figure 9:
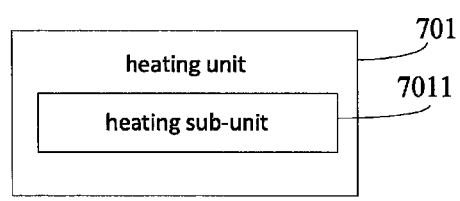
FIG. 9 is a block schematic view of a variant of a heating unit as shown in FIG. 8.

Specifically, the heating unit 701 as shown in FIG. 9 includes: a heating sub-unit 7011, configured to heat the liquid crystal panel placed on the heating device during the heating time duration.

Figure 10:
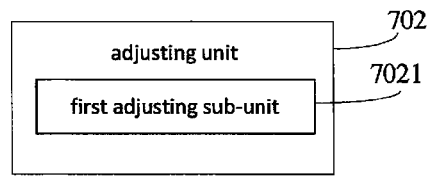
FIG. 10 is a block schematic view of a variant of an adjusting unit as shown in FIG. 8.

The adjusting unit 702 as shown in FIG. 10 includes:

a first adjusting sub-unit 7021, configured to, during the heating process, adjust the position of the liquid crystal panel in the heating device through the at least one angle adjusting process according to the inclination angle, wherein an absolute value of the angle of the liquid crystal panel after each adjustment with respect to the plane in which the heating device is placed is an absolute value of the inclination angle, and the sum of the angles of the liquid crystal panel which are obtained for all of at least two adjustments respectively, with respect to the plane in which the heating device is placed is equal to 0. As an example, the same inclination angle corresponds to the same heating time duration.

Figure 11:
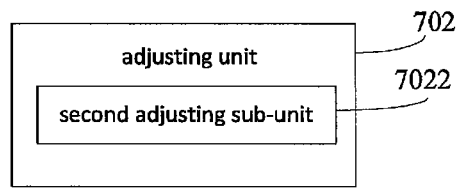
FIG. 11 is a block schematic view of another variant of the adjusting unit a shown in FIG. 8.

The adjusting unit 702 as shown in FIG. 11 can also include a second adjusting sub-unit 7022, configured to at each angle adjusting process adjust the angle of the liquid crystal panel with respect to the plane in which the heating device is placed by adjusting the telescopic length of at least one telescopic motor, so that the position of the liquid crystal panel in the heating device is adjusted.

Figure 12:
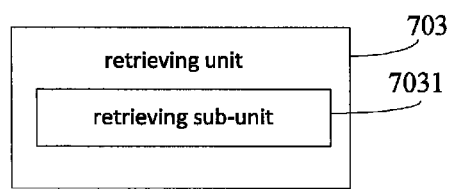
FIG. 12 is a block schematic view of a variant of a retrieving unit as shown in FIG. 8.

The retrieving unit 703 as shown in FIG. 12 can also include a retrieving sub-unit 7031 configured to determine an inclination angle of the liquid crystal panel depending on the sizes of the first and second substrates and the size of the display unit within the first and second substrates.

Figure 13:
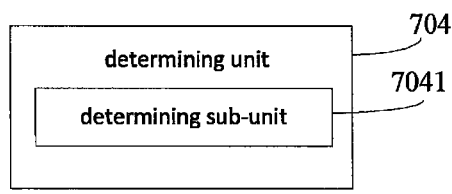
FIG. 13 is a block schematic view of a variant of a determining unit as shown in FIG. 8.

The determining unit 704 as shown in FIG. 13 can also include a determining sub-unit 7041 configured to determine a heating time duration of the liquid crystal panel depending on the sizes of the first and second substrates and the size of the display unit within the first and second substrates.

In addition, it should be noted that the units as shown in FIG. 8 can be explained with reference to the structure as shown in FIG. 4. The adjusting unit as shown in FIG. 8 can include the telescopic motors 4011, 4021, 4031, 4041 and the bar 406 as shown in FIG. 4. The fixing unit in FIG. 8 can fix the pillars 401, 402, 403 and 404 as shown in FIG. 4.

The person skilled in the art can clearly know for sake of convenience and conciseness of description, the specifically working process of the above described devices and units can be referred to the corresponding processes as described in the method embodiment above, and they are not discussed again.

Concerning the above, with the method for producing the liquid crystal panel of the present embodiment, during the heating process, the position of the liquid crystal panel in the heating device is adjusted by at least one angle adjusting process, so as to heat the inclined liquid crystal panel at multiple times. As compared to the liquid crystal heating means upon producing the existing liquid crystal panel, the liquid crystals diffuse more sufficiently and uniformly within the closed space formed by the substrates, especially for the liquid crystals at the edge and corners thereof. This will not affect the pre-tilt effect of the lower alignment film of the liquid crystal panel to the liquid crystals. Therefore, the displaying quality of the liquid crystal panels is improved.

The above embodiments are the preferred embodiments of the present application, and are not used to limit the present application. It should be noted that various modifications and changes may be made to the present disclosure by those skilled in the art without departing from the principles and spirit of the present application. As such, these modifications and changes to the present application are also intended to be included within the present application if they fall within the scopes of the present application defined by claims and equivalents thereof.

What is claimed is:

1. A method for producing a liquid crystal panel, wherein the liquid crystal panel comprises a first substrate, a second substrate and liquid crystals between the first substrate and the second substrate, wherein, the method comprises the steps of:
heating the liquid crystal panel placed onto a heating device;
adjusting a position of the liquid crystal panel in the heating device through at least one angle adjusting process during the heating process, wherein the at least one angle adjusting process comprising:
adjusting an angle of the liquid crystal panel with respect to a plane in which the heating device is placed at least twice, the angle of the liquid crystal panel after each adjustment with respect to the plane in which the heating device is placed has an absolute value larger than 0, and a sum of the angles of the liquid crystal panel which are obtained for all of at least two adjustments respectively, with respect to the plane in which the heating device is placed is equal to 0.

2. The method as claimed in claim 1, wherein, before the step of heating the liquid crystal panel placed on the heating device, the method further comprises:
retrieving an inclination angle of the liquid crystal panel; and
determining a heating time duration of the liquid crystal panel.

3. The method as claimed in claim 2, wherein, the step of heating the liquid crystal panel placed on the heating device further comprises:
heating the liquid crystal panel placed onto the heating device within the heating time duration, wherein an absolute value of the angle of the liquid crystal panel with respect to the plane in which the heating device is placed is equal to an absolute value of the inclination angle of the liquid crystal panel.

4. The method as claimed in claim 2, wherein, the inclination angle is larger than or equal to 5° but smaller than or equal to 10°; and the heating time duration is larger than or equal to 2 minutes but smaller than or equal to 5 minutes.

5. The method as claimed in claim 1, wherein, a plurality of pillars for fixing the liquid crystal panel are provided within the heating device, each pillar is provided with a telescopic motor, and before the step of heating the liquid crystal panel placed on the heating device, the method further comprises:
fixing an edge of the liquid crystal panel onto the pillar of the heating device so that the liquid crystal panel is parallel to the plane in which the heating device is placed.

6. The method as claimed in claim 5, wherein, the step of adjusting the position of the liquid crystal panel in the heating device through the at least one angle adjusting process, comprises:
during each angle adjusting process, adjusting the angle of the liquid crystal panel with respect to the plane in which the heating device is placed by adjusting a telescopic length of at least one telescopic motor so that the position of the liquid crystal panel in the heating device is adjusted.

7. The method as claimed in claim 2, wherein,
the step of retrieving the inclination angle of the liquid crystal panel comprises determining the inclination angle of the liquid crystal panel depending on sizes of the first substrate and the second substrate, and a size of a display unit within the first and second substrates;
the step of determining the heating time duration of the liquid crystal panel comprises determining the heating time duration of the liquid crystal panel depending on sizes of the first substrate and the second substrate, and a size of a display unit within the first and second substrates.

8. The method as claimed in claim 7, wherein, the same inclination angle corresponds to the same heating time duration.

9. The method as claimed in claim 1, wherein, before the step of heating the liquid crystal panel placed on the heating device, the method further comprises:
   preheating the liquid crystal panel placed on the heating device in a preset duration.

10. The method as claimed in claim 9, wherein, the preset duration is larger than or equal to 50 minutes but less than or equal to 70 minutes.

11. A heating device for a liquid crystal panel, configured to heat liquid crystals of the liquid crystal panel, wherein the liquid crystal panel comprises a first substrate, a second substrate, and liquid crystals between the first and second substrates, wherein, the heating device comprises:
   a heating unit, configured to heat the liquid crystal panel placed on the heating device;
   an adjusting unit, configured to, during the heating process, adjust the position of the liquid crystal panel in the heating device through at least one angle adjusting process, wherein the at least one angle adjusting process includes:
   adjusting an angle of the liquid crystal panel with respect to a plane in which the heating device is placed at least twice, the angle of the liquid crystal panel after each adjustment with respect to the plane in which the heating device is placed has an absolute value larger than 0, and a sum of the angles of the liquid crystal panel which are obtained for all of at least two adjustments respectively, with respect to the plane in which the heating device is placed, is equal to 0.

12. The heating device as claimed in claim 11, wherein, the heating device further comprises:
   a retrieving unit configured to retrieve an inclination angle of the liquid crystal panel;
   a determining unit configured to determine a heating time duration of the liquid crystal panel.

13. The heating device as claimed in claim 11, wherein, the heating unit comprises a heating sub-unit configured to heat the liquid crystal panel placed on the heating device during the heating time duration;
   the adjusting unit comprises a first adjusting sub-unit configured to during the heating process, adjust the position of the liquid crystal panel in the heating device through the at least one angle adjusting process according to the inclination angle, wherein an absolute value of the angle of the liquid crystal panel after each adjustment with respect to the plane in which the heating device is placed is equal to an absolute value of the inclination angle, and the sum of the angles of the liquid crystal panel which are obtained for all of at least two adjustments respectively, with respect to the plane in which the heating device is placed, is equal to 0.

14. The heating device as claimed in claim 12, wherein, the inclination angle is larger than or equal to 5° but less than or equal to 10°;
   the heating time duration is larger than or equal to 2 minutes but less than or equal to 5 minutes.

15. The heating device as claimed in claim 11, wherein, a plurality of pillars for fixing the liquid crystal panel are provided within the heating device, each pillar is provided with a telescopic motor.

16. The heating device as claimed in claim 15, further comprising:
   a fixing unit configured to fix an edge of the liquid crystal panel on the pillar of the heating device, so that the liquid crystal panel is parallel to the plane in which the heating device is placed.

17. The heating device as claimed in claim 15, wherein, the adjusting unit comprises a second adjusting sub-unit, configured to during each angle adjusting process adjust the angle of the liquid crystal panel with respect to the plane in which the heating device is located by adjusting a telescopic length of at least one telescopic motor, so that the position of the liquid crystal panel in the heating device is adjusted.

18. The heating device as claimed in claim 12, wherein, the retrieving unit comprises a retrieving sub-unit configured to determine the inclination angle of the liquid crystal panel depending on sizes of the first and second substrates and a size of the display unit within the first and second substrates;
   the determining unit comprises a determining sub-unit configured to determine the heating time duration of the liquid crystal panel depending on the sizes of the first and second substrates and the size of the display unit within the first and second substrates.

19. The heating device as claimed in claim 18, wherein, the same inclination angle corresponds to the same heating time duration.

20. The heating device as claimed in claim 11, further comprising:
   a preheating unit configured to preheat the liquid crystal panel placed on the heating device in a preset duration;
   the preset duration is larger than or equal to 50 minutes but less than or equal to 70 minutes.

* * * * *